US009026084B2

(12) United States Patent
Szesztay et al.

(10) Patent No.: US 9,026,084 B2
(45) Date of Patent: May 5, 2015

(54) ENHANCED PRIVACY PROTECTION IN A TELECOMMUNICATION NETWORK

(75) Inventors: Endre Szesztay, Törökbálint (HU); Attila Mihály, Dunakeszi (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 52 days.

(21) Appl. No.: 13/809,144

(22) PCT Filed: Jul. 12, 2010

(86) PCT No.: PCT/EP2010/004235
§ 371 (c)(1),
(2), (4) Date: Jan. 23, 2013

(87) PCT Pub. No.: WO2012/007018
PCT Pub. Date: Jan. 19, 2012

(65) Prior Publication Data
US 2013/0115921 A1    May 9, 2013

(51) Int. Cl.
*H04M 3/42* (2006.01)
*H04M 3/436* (2006.01)
*H04W 12/02* (2009.01)
*H04W 12/08* (2009.01)
*H04W 8/26* (2009.01)
*H04W 76/02* (2009.01)

(52) U.S. Cl.
CPC ........ *H04M 3/4365* (2013.01); *H04M 3/42008* (2013.01); *H04M 3/42042* (2013.01); *H04M 3/436* (2013.01); *H04W 8/26* (2013.01); *H04W 12/02* (2013.01); *H04W 12/08* (2013.01); *H04W 76/02* (2013.01); *H04W 76/027* (2013.01)

(58) Field of Classification Search
CPC .................... H04M 3/42008; H04M 3/42042; H04M 3/436; H04M 3/4365; H04W 8/26
USPC ................................... 455/411; 379/142, 211
See application file for complete search history.

(56) References Cited

U.S. PATENT DOCUMENTS

| 5,590,184 A | 12/1996 | London |
| 6,327,353 B1 | 12/2001 | Fukuzawa et al. |
| 2007/0121871 A1 | 5/2007 | Mullis et al. |

FOREIGN PATENT DOCUMENTS

| CN | 1345153 A | 4/2002 |
| EP | 2099205 A1 | 9/2009 |
| KR | 100403148 B1 | 10/2003 |
| WO | 2007080422 A1 | 7/2007 |

OTHER PUBLICATIONS

International Search Report (mailed Jun. 8, 2011) in re: International Application No. PCT/EP2010/004235.

*Primary Examiner* — Charles Shedrick
(74) *Attorney, Agent, or Firm* — Coats & Bennett, PLLC

(57) ABSTRACT

The present invention relates to enhanced privacy protection in a telecommunication network in which unique virtual phone numbers are used that are called party specific, i.e., different virtual phone numbers are used for the relation of different communication between a subscriber (101) of the privacy service and other parties (102). That is, if a given virtual number is called from a different number that was assigned to, then this call will be rejected, but the call will be set up if the given virtual phone number is called from a phone number that was assigned to. In this way, the privacy is better protected.

18 Claims, 4 Drawing Sheets

| | 201 | 202 | 203 | 204 |
|---|---|---|---|---|
| | Other party phone number | Virtual phone number | Subscriber phone number | Other party specific rules |
| | (+36 xx) xxxxxx1 | (+36 30) 08 yyyyyyy1 | (+36 30) zzzzzzz1 | Only after 4PM |
| | (+36 xx) xxxxxx2 | (+36 30) 08 yyyyyyy2 | (+36 30) zzzzzzz1 | Only before 4PM |
| | ... | ... | ... | ... |
| | (+36 xx) xxxxxx9 | (+36 30) 08 yyyyyyy1 | (+36 30) zzzzzzz9 | ... |

Figure 2

ENHANCED PRIVACY PROTECTION IN A TELECOMMUNICATION NETWORK

TECHNICAL FIELD

The present invention relates to both legacy and new generation telecommunication networks. In particular, and not by way of limitation, the present invention is directed to a system, a database and a method for Plain Old Telephony Service (POTS)/Public Switched Telephony Service (PSTN), ISDN, Global System for Mobile telecommunications (GSM), 3 G and Long Term Evolution (LTE)/System Architecture Evolution (SAE) networks.

BACKGROUND

The network operators may differentiate themselves by providing value-added services to the subscribers. One possibility for this is using the Intelligent Network (IN) architecture, or more recently, the IMS (IP Multimedia Subsystem) architecture. Providing privacy protection for the subscribers is one of the services customers demand. The basic privacy protection today is that the operators may offer private-number plans i.e. with numbers remaining unpublished in directories. The subscribers may also choose to disable their phone number (caller ID) when initiating a call.

A more evolved service available today is that the subscribers get a 'virtual number' that may be used to receive a call from an untrusted party. The subscribers may then tailor the usage of this virtual number in many ways e.g., by limiting the validity period. An example patent specification describing such a service is found in U.S. Pat. No. 5,590,184.

A common feature of the privacy services available today is that there is a trade-off between privacy and reachability of the subscriber. If one disables its phone number then others cannot reach him even when this would be desirable. Also, many phone owners hate phone calls from a secret number and they may choose not to answer the call if caller number is not visible. On the other hand, a virtual number provides only limited privacy in the sense that once the relation to the party that is using it is disclosed, anyone may abuse of it.

The virtual number services are also somewhat cumbersome to use since one has to register, and then manipulate the virtual numbers that are given. If used through a $3^{rd}$ party provider, first a call should be made towards the virtual number and then another call should follow that will use in turn the virtual number as the calling party number. Yet another problem is that, when abuse is detected, the solution is to use call barring for the given virtual number, but this then applies to all involved parties, not only the abusing one. The impact may be partially diminished by using multiple virtual numbers, but this represents increased management overhead, and will also have cost impact as the pool of virtual phone numbers to use is limited and must be shared among all participants.

Thus there is a particular need for providing an enhanced privacy protection method, where the privacy and flexibility problems represented by using a generic virtual number are resolved, without increasing the management complexity either from operator or from customer side.

SUMMARY

The present invention involves a new system, a database and a method which solves the aforementioned problems, as well as other problems that will become apparent from an understanding of the following description.

The point of the invention is to use unique virtual phone numbers that are called party specific, i.e., different virtual phone numbers are used for the relation of different communication between a subscriber of the privacy service and other parties. That is, if a given virtual number is called from a different number that was assigned to, then this call will be rejected, but the call will be set up if the given virtual phone number is called from a phone number that was assigned to. In this way, the privacy is better protected. Also, this makes it possible to define called-party specific privacy rules for the different virtual numbers that makes the service more flexible.

In one embodiment, the virtual numbers are generated automatically when the subscriber generates the first call towards another party and are connected to the called number. The called other party then may call back the subscriber by using this virtual number given that the generic and party specific rules are satisfied.

In another embodiment the invention also offers solution for pre-defined virtual numbers based on the agreement between the subscriber and the network operator to give the possibility that the subscriber to the service be called before making any calls to the other party. These numbers are also tied to the caller number during the first time when they are called.

The most important advantage of the invention that it is a lightweight solution that provides a better and more flexible privacy for the subscribers than all existing solutions.

It is also advantageous that it is applicable in all known telecommunication networks.

Another advantage is that it does not require standardization support.

The target customer groups are famous people, businessmen, politicians, celebrities.

The present invention enables matchmaking, and gives possibility for people looking for mates. It is also advantageous for small entrepreneurs and direct marketing, pollster companies and private people now being somewhat frustrated to give their private phone number but wanting to keep the possibility to be called back.

BRIEF DESCRIPTION OF THE DRAWINGS

For a more complete understanding of the invention, reference is made to the following detailed description taken in conjunction with the accompanying drawings wherein:

FIG. 2 shows the mapping table of the database;

DETAILED DESCRIPTION

Figure 1:
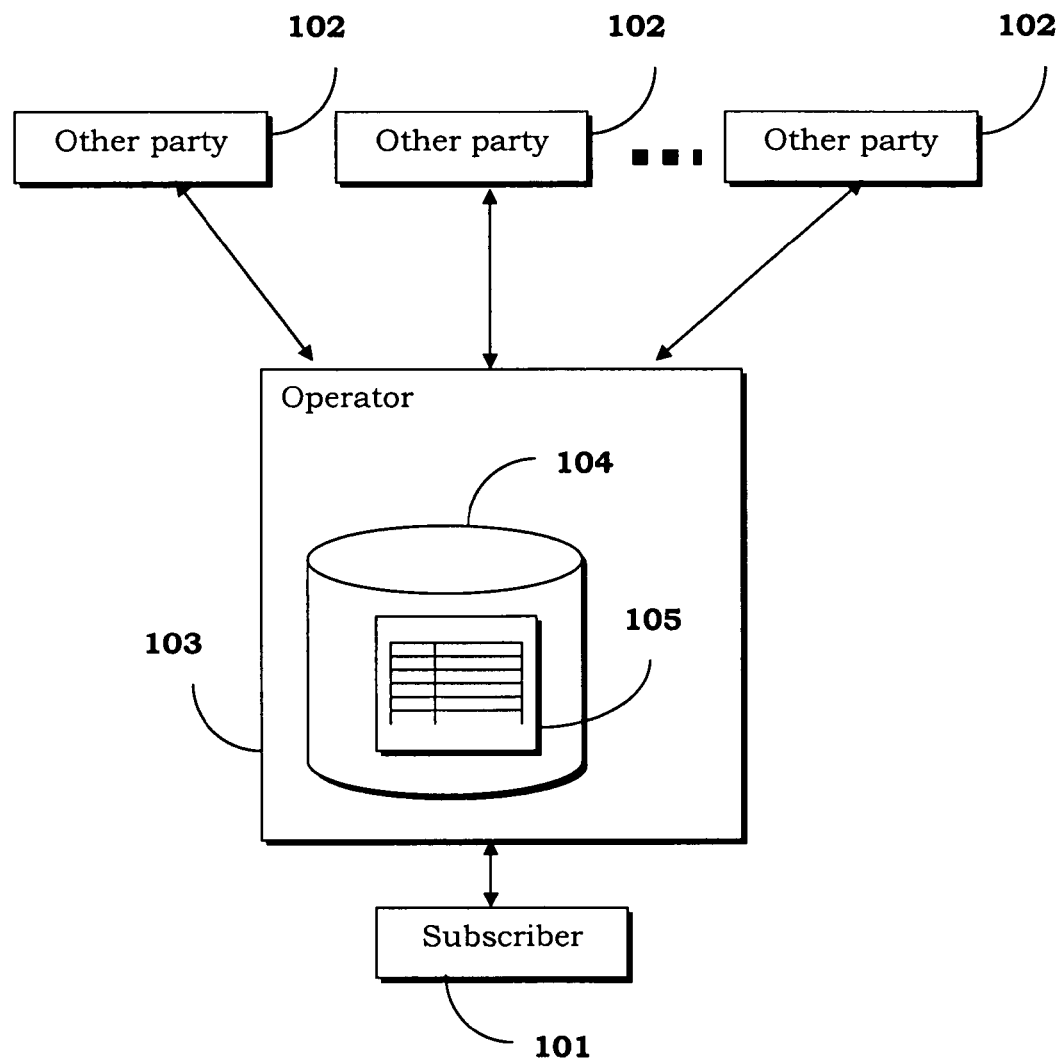
FIG. 1 illustrates the simplified chart of the system.

In FIG. 1 the system of enhanced privacy protection consists of a subscriber 101 communicating with another party 102 through an operator 103 having a database 104 including a mapping table 105.

The enhanced privacy protection is based on maintaining this mapping table 105 by the operator 103, where virtual phone numbers assigned towards different numbers of other parties 102 are stored.

New entries in the mapping table 105 can be created on-demand, i.e., every time when the subscriber 101 generates a first call towards a new other party 102 and wants to use the privacy service; or pre-established by the operator 103 when the subscriber 101 asks for pre-established virtual phone numbers. This may be needed e.g., when the subscriber 101 needs virtual phone numbers in advance to communicate with other parties, e.g., wants to put them on name cards or send them via email. Uniqueness per other party 102 applies also for these types of numbers, i.e., a different phone number is printed on each name card. When the subscriber 101 asks for a set of such phone numbers, a record is created for each phone number in the set in the mapping table 105, with the "other party" phone number left blank. This will be filled in upon the first call towards the given virtual number, as described later on in FIG. 4.

An example mapping table stored in a database is shown in FIG. 2. The mapping table comprises records with a data field 201 of the other party 102 phone number, a data field 202 of the virtual phone number and a data field 203 of the subscriber 101 phone number. The mapping table also contains a data field 204 where the other party specific privacy protection rules are set. These rules may be similar as the generic rules stored in the subscriber profile, but the difference is that they only apply for the given other party 102.

The subscriber 101 should specify the rules upon making a call towards the other party 102. One possibility is to have application support in the subscriber terminal to specify the rules. In this way the subscriber e.g. navigates to the menu item of "Applications" in the terminal and activates an application intended for specifying such rules. Alternatively, one could use special characters pre-pending the called party number, e.g., #21# could mean that calls from this other party 102 are accepted only after 4 PM.

Records from the mapping table are removed when a certain subscription ends, or when it is indicated by rules, e.g., the timer related to a given record expires, or when there was a limited number or calls indicated and this has been reached. Note that the virtual phone numbers should not be unique itself, i.e., the same virtual phone number can be reused for multiple subscribers to the service. The only requirement towards the virtual phone number is to be unique per other party phone number, in order that the subscriber phone number could be unambiguously identified during a call. E.g., the same virtual number of (+36 30) 08 yyyyyyy 1 can be assigned to other party phone number of (+36 xx) xxxxxx1 as well as to the other party phone number of (+36 xx) xxxxxx9. Since there are only in the order of hundred phone numbers in an average personal phone directory, one could conclude that the pool of virtual numbers will not represent a bottleneck for this solution.

In any case, some removal algorithm based on ageing of the records is recommended in order to keep the mapping table size limited. One example could be the Least Recently Used (LRU) that would delete the record for the other party-virtual phone number that has been least recently looked up to make a call.

Figure 3:
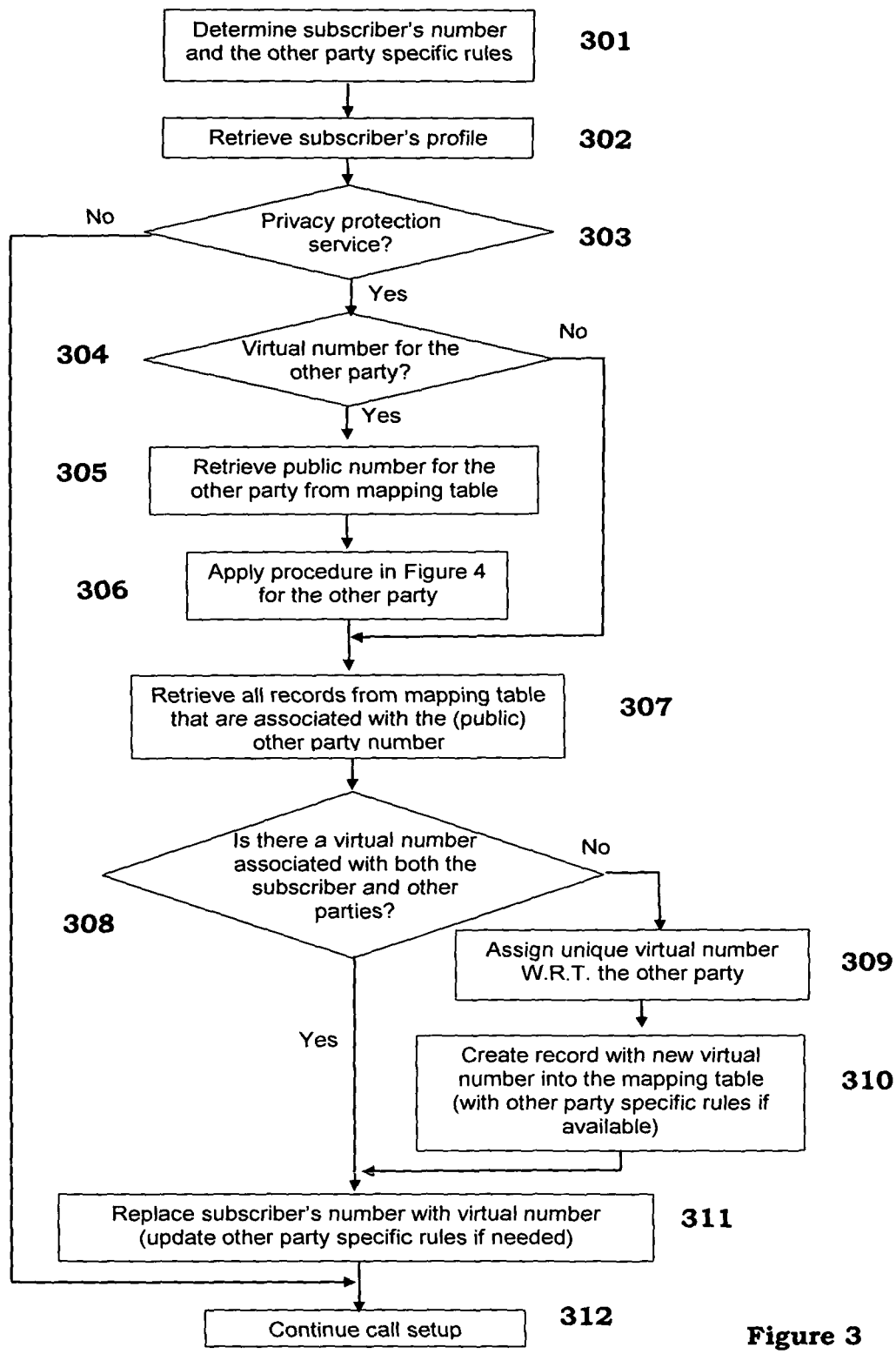
FIG. 3 depicts a preferred embodiment of a call setup procedure for a subscriber who has subscribed to the privacy service.

FIG. 3 shows a possible call setup procedure from a subscriber who has subscribed to the privacy service. In the first step 301 the calling subscriber's phone number and the called other party specific rules are determined. In the next step 302 the subscriber's profile is retrieved. Then (step 303), the use of privacy protection service is decided. Whether or not a virtual phone number should be assigned to the call is determined either from the subscriber profile or based on indications given by the subscriber when generating the call. For example, even if the caller is subscribed to the privacy service, when calling a trusted party, its public phone number should not be necessarily replaced by a virtual number. This may be achieved either by application support e.g., the application asks for virtual number generation only if for instance there is no phone book entry for the called number, or specified by the subscriber e.g., switching on or off the privacy service when making the call. In case of rejecting the privacy service, the call set up procedure continues with the call setup step 312. In case of enabling the privacy protection service, the called other party's virtual phone number is checked (step 303) whether it is also subscribed for the same privacy protection service. If yes, the public number for the other is retrieved from the mapping table (step 305) and an automated virtual number generation procedure is applied (step 306) for the other party according to FIG. 4. In the next step 307, all records from the mapping table that are associated with the public phone number of the other party are retrieved, and it is decided whether a virtual phone number associated with both the subscriber and the other party exists (step 308). If no, then a unique virtual phone number is assigned with respect to the other party (step 309) and a record with new virtual phone number is created in the mapping table with other party specific rules if they are available (step 310). Then (step 311) subscriber's phone number is replaced the virtual phone number with updated other party specific rules if needed. By these, the privacy protection service specific steps are completed and the regular call setup procedure continues (step 312).

Figure 4:
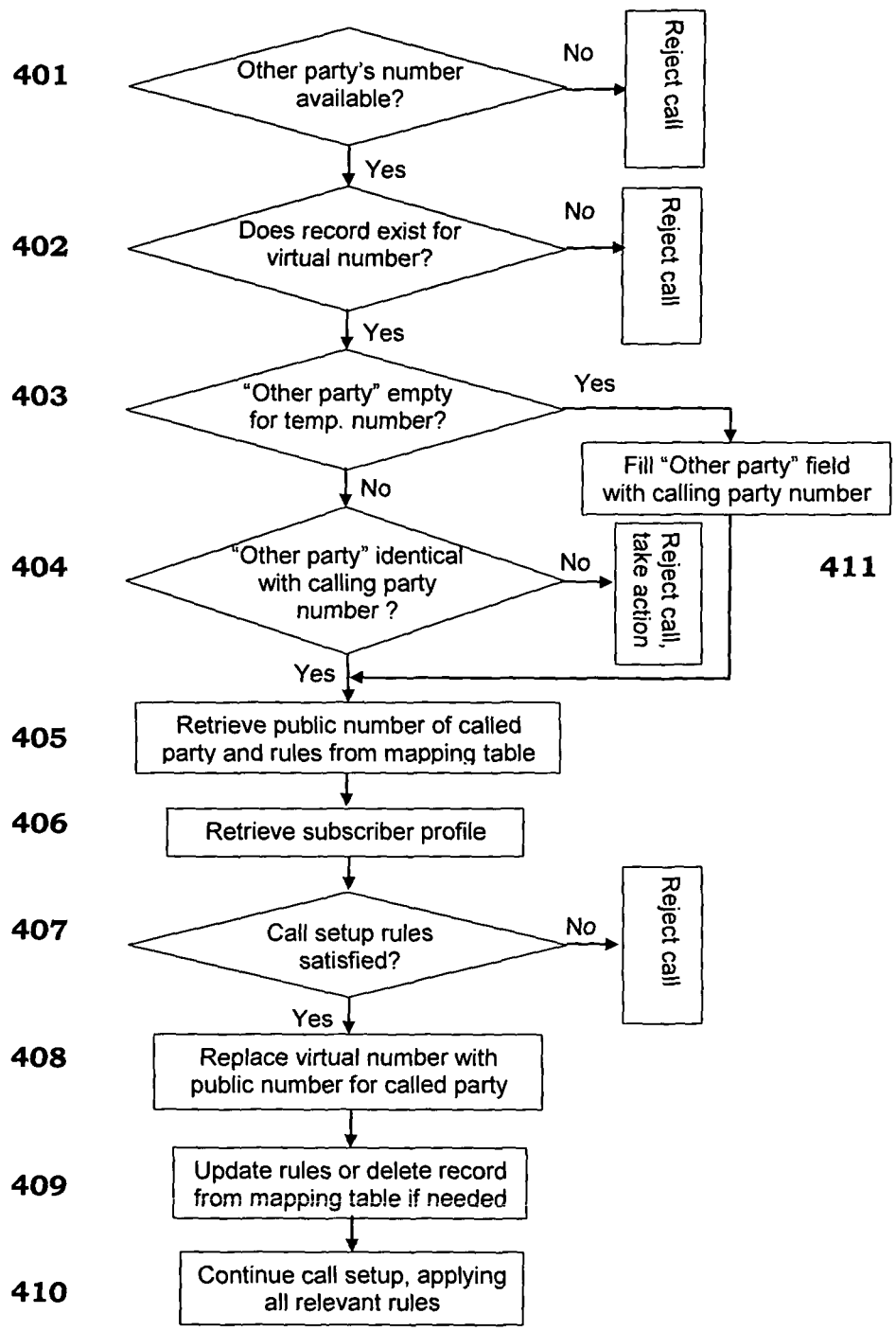
FIG. 4 shows a preferred embodiment of a procedure for call setup handling towards a virtual phone number.

FIG. 4 shows the flow chart of setting up a possible calling procedure towards a virtual number. In this figure the subscriber is the called party and the caller is the other party. It should be noted that there are a number of cases when the call setup is not completed, but rejected by the system. A possible situation when the calling other party cannot be identified, so it is checked whether the calling other party's phone number is available (step 401). A specific case of call rejection is when there is no appropriate record found for the given virtual phone number (step 402). The virtual phone number may be identified by the system e.g., by a special prefix, for instance numbers starting with '08' in the mapping table from FIG. 2. If "Other party" field for the virtual phone number in the mapping table is empty (step 403) then it shall be filled in with the calling party phone number (step 411). Then it is checked if the phone number in the "Other party" field of the mapping table is identical with the calling party phone number (step 404). In cases when there is a strong indication for abuse e.g., the given virtual number exists but is assigned to another party, the system may take appropriate actions, e.g., logging the phone number of the calling other party, announcing the subscriber of the fraud, etc. It may also happen that the called party itself abuses/misuses the virtual number that is given to him. In this case the system makes the call. However, it is easy to define means for the subscriber to the privacy service to deny any further calls from that virtual number. One is that a message, e.g., Short Message Service (SMS), is sent with the calling number and indication that the related record should be removed from the mapping table. Note that according to FIG. 4 it is not possible to make a call towards a virtual number from a secret number. If the phone number in the "Other party" field of the mapping table is identical to the phone number of the calling other party then the public phone number and rules of the called subscriber are retrieved from the mapping table (step 405) and the subscriber profile is also retrieved (step 406). Then the satisfaction of the call setup rules is checked (step 407). Besides subscription information, the subscriber profile may also contain generic rules to be applied to all calls towards virtual phone numbers related to the subscriber. (The called party specific rules are stored in the mapping table, as shown in FIG. 2). The rules are an advantageous ingredient for providing a proper privacy service. One aspect is that the subscriber probably does not want to be called back any time and any times. For the later one could specify hard limits e.g., "only after 4 PM", but may also be based on user's availability information from the IMS/Presence service, like "free for chat", "busy", "away", "do not disturb", "out to lunch". Other availability parameters may be defined to better fit the customer needs. Besides the generic rules, there may be specific rules to be applied for the given relation. The subscriber should specify the rules upon calling the other party. These rules are then stored in the mapping table as a new record in case when the subscriber makes the first call towards the called party. Alternatively, if there is already a record established i.e., this is not the first call, but still some rules are specified by the subscriber, then the existing rules are overwritten by the new rules in the mapping table. If all the rules are satisfied then virtual phone number of the called subscriber is replaced with his public phone number (step 408). Optionally, records of the mapping table are deleted or updated (step 409), as it was described at the mapping table (FIG. 2), before continuing the regular call setup procedure with relevant rules (step 410).

Although the present invention has been described in detail with reference to only a few exemplary embodiments for Plain Old Telephony Service (POTS)/Public Switched Telephony Service (PSTN), ISDN, Global System for Mobile telecommunications (GSM), 3 G and Long Term Evolution (LTE)/System Architecture Evolution (SAE) networks, those skilled in the art will appreciate that various modifications can be made without departing from the invention. Accordingly, the invention is defined only by the following claims, which are intended to embrace all equivalents thereof.

The invention claimed is:

1. A method for enhanced privacy protection in a telecommunication network in which a privacy service of a network operator is applied to a subscriber communicating with other parties, the method implemented at a server device in the telecommunication network during a call setup procedure and comprising:
    identifying, at the server device, the subscriber applying the privacy service of the network operator in correlation to the other parties;
    identifying, at the server device, a phone number of another party communicating with the subscriber in the privacy service;
    assigning, at the server device during the call setup procedure, a virtual phone number that is unique to the relation between the subscriber and the phone number of the another party communicating with the subscriber, wherein assigning the virtual phone number comprises automatically generating the virtual phone number responsive to the subscriber generating a first call towards the another party and is connected to the called number;
    at the server device, rejecting calls towards the virtual phone number initiated by a calling party that is different from the party the virtual number is assigned to; and
    at the server device, setting up calls towards the virtual phone number initiated by a calling party that is identical to the party the virtual number is assigned to.

2. The method of claim 1 in which the virtual phone number is pre-defined by the subscriber.

3. The method of claim 1 in which rejecting calls towards the virtual phone number is further determined by other party specific privacy rules.

4. The method of claim 3 in which the other party specific privacy rules are activated by application support in the subscriber terminal.

5. The method of claim 3 in which the other party specific privacy rules are activated by special characters pre-pending a called party number.

6. The method of claim 1 in which rejecting a call is followed by announcing the subscriber.

7. The method of claim 1 in which rejecting a call is followed by logging the phone number of the other party.

8. The method of claim 1 in which rejecting a call is further determined by generic rules of subscription information stored in a subscriber profile to be applied to all calls towards virtual phone numbers related to the subscriber.

9. A system for enhanced privacy protection in a telecommunication network in which a subscriber communicates with other parties, the system comprising:
    an operator server device associated with a network operator through which the subscriber communicates with the other parties;
    a database operatively connected to the operator server device, and configured to store a mapping table comprising records associated with a privacy service, each record defining:
        a phone number of the subscriber;
        a phone number of another party; and
        a virtual phone number unique to the phone number of the another party, wherein the virtual phone number is generated automatically during a call setup procedure responsive to the subscriber generating a first call towards the another party and is connected to the called number.

10. The system of claim 9 in which the records associated with the privacy service further define a specific rule for the another party.

11. The system of claim 10, in which the specific rule for the another party comprises time or time constraints of the another party.

12. The system of claim 10, in which the specific rule for the another party comprises availability parameters of the subscriber.

13. The system of claim 10, in which the specific rule for the another party is specified upon calling the another party.

14. A database device for enhanced privacy protection in a telecommunication network in which a subscriber communicates with other parties through a server device provided by a network operator, wherein the database device is configured to store:
    a mapping table comprising records associated with a privacy service provided by the network operator, each record defining:
        a phone number of the subscriber;
        a phone number of another party; and
        a virtual phone number unique to the phone number of the another party, wherein the virtual phone number is generated automatically during a call setup procedure responsive to the subscriber generating a first call towards the another party and is connected to the called number.

15. The database of claim 14, in which the records of the privacy service further define a specific rule for the other party.

16. The database of claim 15, in which the specific rule for the another party comprises time or time constraints of the other party.

17. The database of claim 15, in which the specific rule for the another party comprises availability parameters of the subscriber.

18. The database of claim 15, in which the specific rule for the another party is specified upon calling the another party.

\* \* \* \* \*